Feb. 3, 1959  E. R. KROLL  2,872,200
LEVELING CONTROL FOR HILLSIDE MACHINES
Filed Aug. 16, 1955  4 Sheets-Sheet 1

*INVENTOR.*
E. R. KROLL

Feb. 3, 1959      E. R. KROLL      2,872,200

LEVELING CONTROL FOR HILLSIDE MACHINES

Filed Aug. 16, 1955      4 Sheets-Sheet 2

INVENTOR.
E. R. KROLL

Feb. 3, 1959
E. R. KROLL
2,872,200
LEVELING CONTROL FOR HILLSIDE MACHINES
Filed Aug. 16, 1955
4 Sheets-Sheet 3
FIG. 6
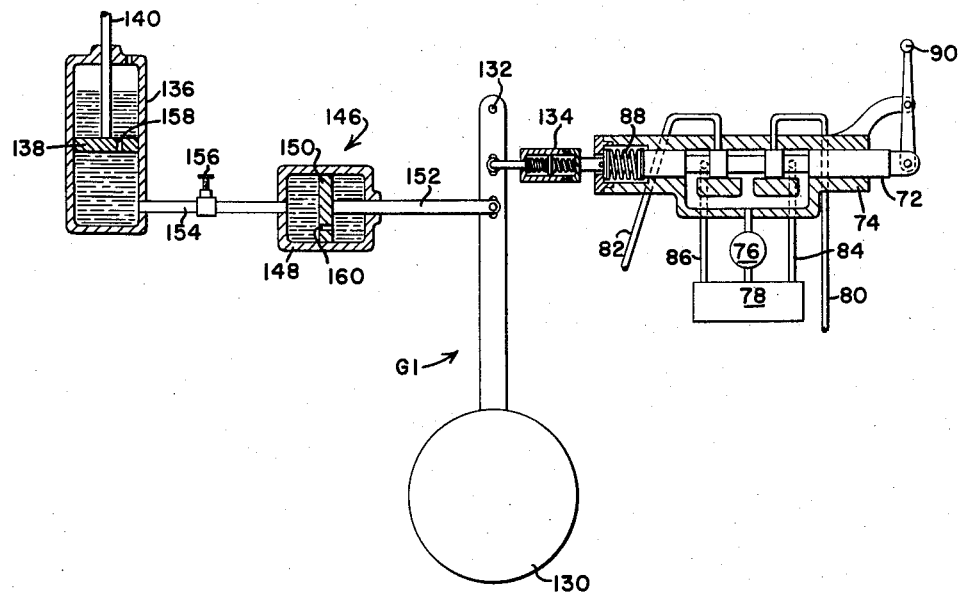
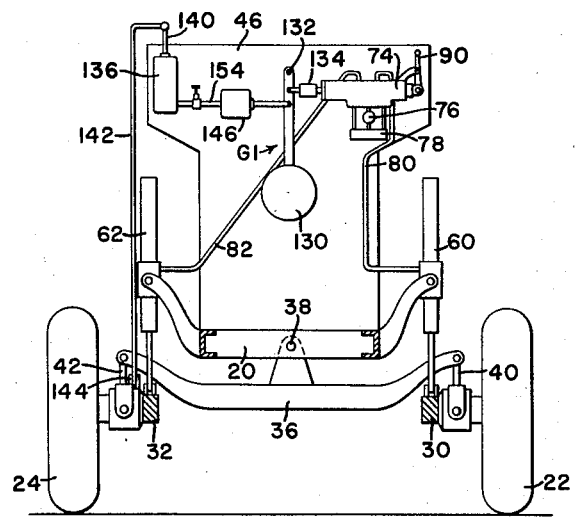
FIG. 7
*INVENTOR.*
E. R. KROLL Feb. 3, 1959     E. R. KROLL     2,872,200
LEVELING CONTROL FOR HILLSIDE MACHINES
Filed Aug. 16, 1955     4 Sheets-Sheet 4

*INVENTOR.*
E. R. KROLL

United States Patent Office 2,872,200
Patented Feb. 3, 1959

2,872,200

LEVELING CONTROL FOR HILLSIDE MACHINES

Everett R. Kroll, Moscow, Idaho, assignor, by mesne assignments, to Deere & Company, a corporation of Delaware Application August 16, 1955, Serial No. 528,686

17 Claims. (Cl. 280—6)

This invention relates to a control system for hillside machines or like equipment that operates on terrain including ground surfaces at varying inclinations to the horizontal.

A typical machine in which the present invention finds substantial practical utility is the hillside combine. The accepted system of operating a combine of the hillside type is to drive the machine along a line of advance to which the surface inclination is transverse. Accordingly, the wheels at one side of the machine will be high and those at the other side will be low. The principal problem, several solutions to which are already extant in the prior art, is to maintain a level position of the body or threshing mechanism irrespective of the differences in elevation between wheels at the opposite sides of the combine. In such machine, it is fundamental that automatic leveling means be provided for maintaining the level position of the body. Conventionally, this means will include one or more hydraulic cylinders in a valve-controlled circuit in which neutral and active positions of the valve are incurred by gravity-influenced means of one type or another. In its simplest form, any automatic leveling system that meets the minimum requirements will operate as follows: As the machine is driven from a level surface onto a surface having lateral inclination, the machine as a whole will tend to lean downhill. This disturbs the gravity-influenced means which in turn activates the hydraulic circuit to tilt the body relative to the wheel means in the opposite direction. When the body reaches its level position, or is re-leveled, the gravity-influenced means returns to normal and it is expected that the hydraulic circuit will be immediately deactivated. However, practical experience has shown that several control problems are presented. In the first place, initial leaning or tilting of the machine may result in over-displacement of the gravity-influenced means. Consequently, the time interval for re-leveling is increased. In the second place, as the body reaches its level position, return of the gravity-influenced means is apt to continue beyond normal and thus effect what is known as over-correction. Hence, the body literally "hunts" a level position and during the period of hunting, the machine may well encounter a slope of different inclination, with the result that the body never quite attains a proper operating position.

According to the present invention, these problems are eliminated by the provision of improvements in a leveling system, which improvements reside primarily in means for preventing hunting and over-correction. In one form of the invention, in which the basic leveling system includes means accommodating the displacement of fluid under the influence of gravity, the control features not only means for retarding excess displacement on initial tilting but means for boosting the effects of gravity on return of the body to level, so that the control means reacts faster than if it were influenced solely by gravity. It is an important object of the invention to provide, in at least one form thereof, an improvement that may be readily incorporated in a leveling system of known design. In all forms of the invention disclosed here, one significant feature is the booster means that derives force from relative movement between the body and the wheels when the body part is re-leveled, which means is operative to add at least part of the derived force to the gravitational force so as to boost or accelerate return of the actuator, such as the hydraulic valve, to its neutral or inactive position.

The foregoing and other important objects and desirable features inherent in and encompassed by the invention will become apparent as preferred embodiments are disclosed in detail in the ensuing specification and accompanying drawings, the several figures of which are described immediately below.

Fig. 6 is a sectional view, somewhat schematic, showing a system that could be substituted for that shown in Fig. 2.

Fig. 7 is a view similar to Fig. 3 but showing the Fig. 6 system.

Figure 1:
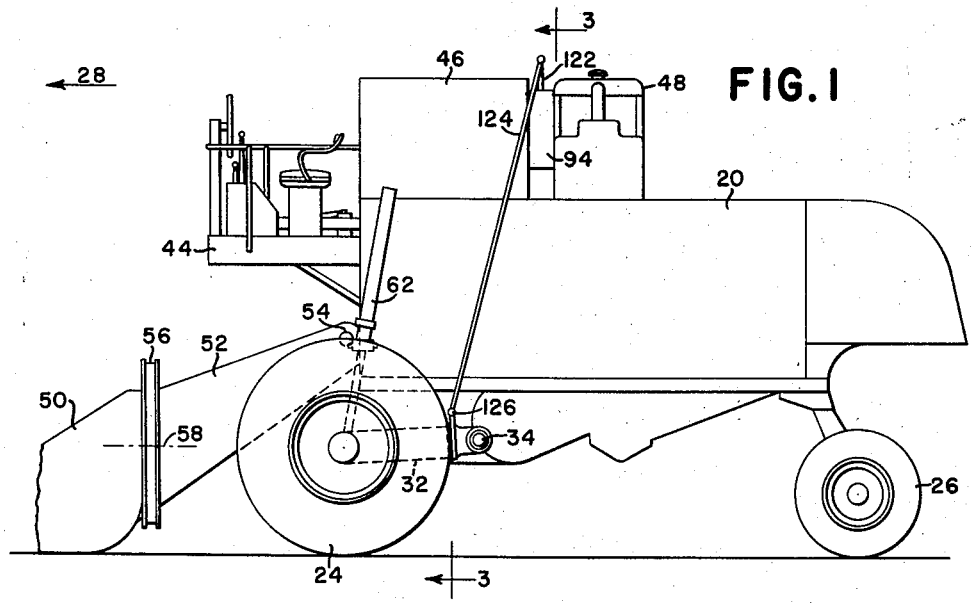
Fig. 1 is a side elevational view of a representative hillside combine.

In the interests of simplicity, the following description will be in terms of a machine that operates on slopes transverse to the line of advance. It will be understood, however, that the same principle may be utilized in leveling fore-and-aft. The use of expressions such as "right" and "left" is based upon the parts of the machine as seen by an observer standing behind the machine and looking forwardly. Figs. 2 through 10 have been drawn so that the reader is placed in that position. As already indicated, the views are somewhat schematic but are deemed adequate for present purposes.

Figs. 1 to 5

A typical combine will be recognized in these drawings as comprising a main body or separator part 20 carried on right and left hand front wheels 22 and 24 and supported on a rear wheeled truck 26. Although the wheels of the truck 26 will assume different elevations, that aspect will be ignored and attention will be devoted to the relationship between the body 20 and front wheels 22 and 24. The front end of the machine can be determined from the location of the front wheels, but for purposes of convenience the direction of advance is indicated by the arrow 28. The wheels 22 and 24 comprise wheel means spaced apart transverse to the length of the body part and consequently transverse to the line of advance. These wheels are individually supported on vertically swingable right and left hand arms 30 and 32, the rear ends of both of which are journaled on a transverse pivot member 34. Therefore, the wheels have individual oscillation in individual vertical planes and are therefore capable of assuming different relative elevations, and the plane of each wheel will remain vertical except when the entire machine is initially tilted. The front ends of the wheels are interconnected by an equalizer bar 36, the midpoint of which is pivoted at 38 to the body 20 and the right and left hand ends of which are articulately connected at 40 and 42, respectively, to the front ends of the wheel arms 30 and 32.

The machine may be considered conventional to the extent that it includes a front-mounted operator's station 44, a grain tank 46 behind the operator's station, and an internal combustion engine 48 just behind the grain tank. A header 50 is positioned transversely across the front of the machine and delivers rearwardly to the body 20 via a feeder house 52. The feeder house 52 is connected to the body 20 by a transverse pivot 54 and thus is level, tilted and re-leveled in unison with the body 20; although, the feeder house and header 50 as a unit may rise and fall about the axis of the pivot 54. Interconnection between the header 50 and the feeder house 52 is effected by a ring or swivel joint 56 that affords a pivot axis on a longitudinal substantially horizontal axis, as suggested by the dot-dash line 58. Because of this articulate interconnection the header 50 will follow the ground contour and will incline in accordance with the inclination to which the wheels 22 and 24 accommodate themselves. Again, the details of construction are unimportant, to the extent described. A representative type of swivel or ring joint is shown in the U. S. patent to Long 2,654,207, except that in that patent the joint 56 is in the vicinity of the joint 54 here. However, the fundamental principles are not without substantial identity. For purposes of the present disclosure, it may be assumed that the pivot axis 58 and the pivot at 38 of the equalizer 36 to the body 20 are substantially coaxial or at least in the same upright longitudinal plane. The subject matter of the forwardly located ring joint, as at 56 here, is presented in assignee's copending application Ser. No. 327,202, filed December 22, 1952, now Patent No. 2,780,903.

The relative positions between the body and the wheels are achieved by power-operated leveling means, here disclosed as being hydraulically operated and including right and left hand motors 60 and 62, the piston rods of which, as at 64 and 66 respectively, are connected to the front ends of the respective wheel arms 30 and 32. The cylinder parts of the motors are mounted by right and left supports 68 and 70 to the respective sides of the body 20. The arrangement is such that extension of one motor is coextensive with retraction of the other, and vice versa.

Figure 2:
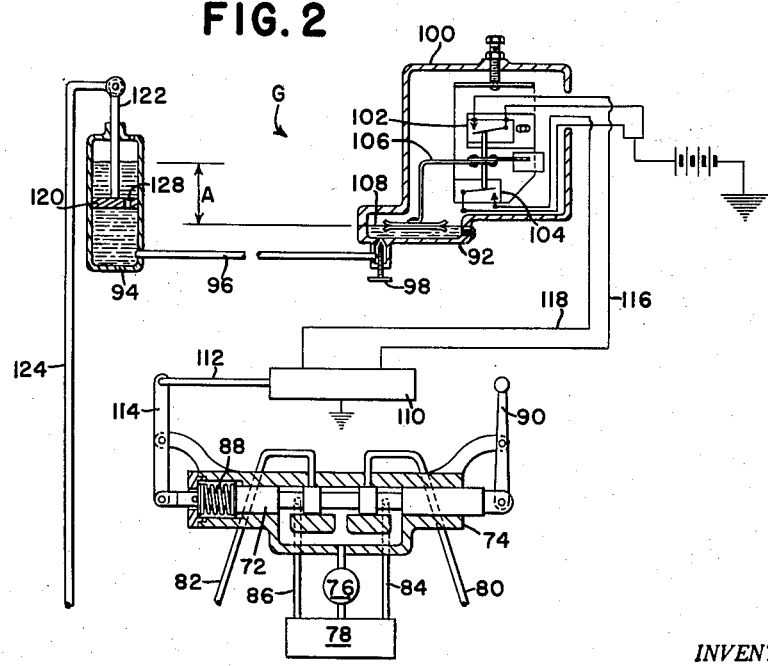
Fig. 2 is a schematic view, partly in section and drawn to a scale enlarged over that of Fig. 1, showing one form of the control system.

The motors are in a hydraulic circuit that includes a main control valve 72, the neutral and active positions of which in a valve housing 74 determines whether the motors will be extended, retracted or hydraulically locked. The circuit is illustrated schematically in Fig. 2 as including a pump 76 and a reservoir 78. Motor ports connected via right and left hand fluid lines 80 and 82 to the motors 60 and 62, respectively, are isolated from the pump and reservoir when the valve or actuator 72 is in its neutral position as shown in Fig. 2. When the valve 72 is shifted to the right, to a first active position, the line 80 is connected to the pump and the line 82 is connected to the reservoir. Hence, the right hand motor 60 will extend and the left hand motor will retract. Shifting of the valve 72 to the left of its neutral position, to a second active position, reverses the fluid pressure to and from the motors so that the left hand motor extends while the right hand motor retracts. Return of fluid to the reservoir 78 is accomplished by right and left hand reservoir lines 84 and 86. The operation of the valve is deemed to be obvious without further description.

The actuator or valve 72 is centered in its neutral position by centering means 88 and may be manually shifted to either of its active positions, as by a hand lever 90. In a commercial application of the system, the hand lever would be convenient to an operator on the station 44. However, a schematic illustration lends itself best to the present disclosure. These and other details form the subject matter of assignee's copending application Ser. No. 430,338, filed May 17, 1954, now Patent No. 2,801,511.

Figure 3:
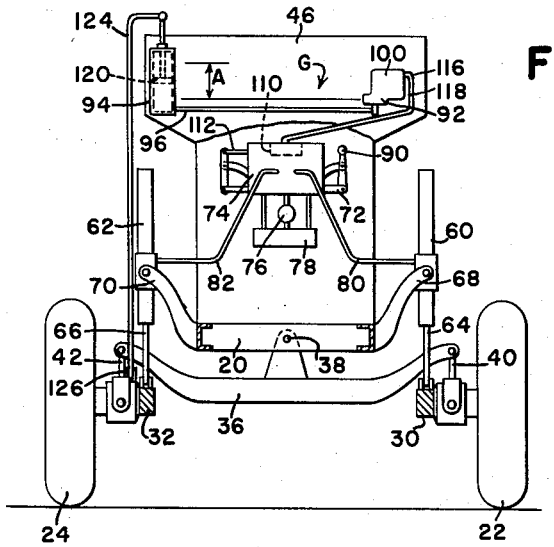
Fig. 3 is a combined sectional-elevational view as seen along the line 3—3 of Fig. 1, with some illustrative liberties indulged to facilitate the disclosure, the machine there shown being in a normal or level position.
Figure 4:
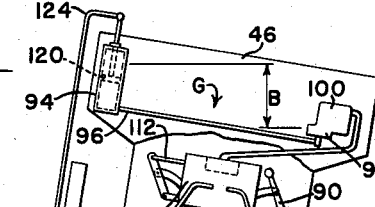
Fig. 4 is a similar view but showing the entire machine tilted or leaning just prior to the activation of the control system.
Figure 5:
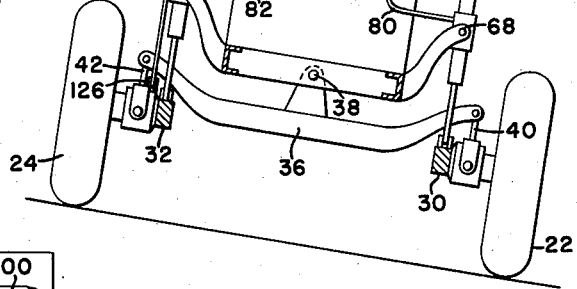
Fig. 5 illustrates the position of the machine when the body part is re-leveled and the wheels are on a transverse slope.
Figure 5:
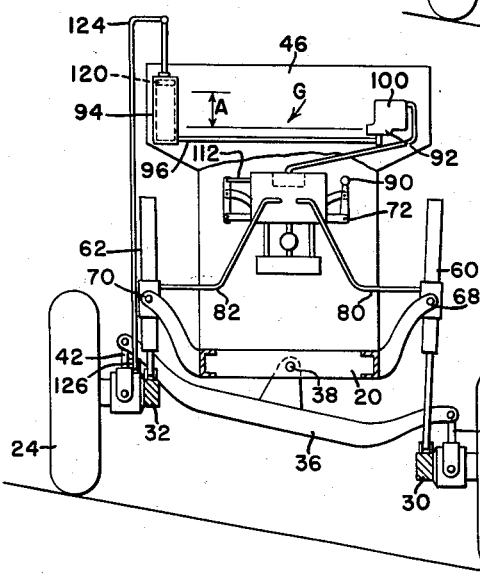

The valve is under control of gravity-influenced means, indicated generally by the letter G, which means comprises first and second liquid containers 92 and 94. As best shown in Figs. 3, 4 and 5, these containers are mounted respectively at the right and left hand sides of the body, preferably on the rear wall of the grain tank 46; although, they may be placed in any other position that will give the results to be described below. These containers are interconnected by a conduit 96 and the principle of operation is based upon a liquid head differential between the heights of liquid in the containers. A needle valve 98 may be used to adjust the rate of flow through the conduit. Affixation of the containers to the body may be effected in any suitable manner. As will be seen in Figs. 2 and 3, the liquid head differential is a certain amount, designated here by the letter A, in which connection cognizance must be taken of the difference in scales between Figs. 2 and 3. When the combine tilts to the right, as in Fig. 4, the liquid head increases, as shown at B. When the body is re-leveled, as in Fig. 5, the liquid head differential returns to A.

The liquid container 92 is the bottom half of a housing that includes as its upper half an electrical switch box 100 in which are right and left hand electrical switches 102 and 104 controlled by an arm 106 to which is attached a diaphragm 108. This diaphragm divides the housing 92 and 100 and serves to contain liquid below itself or in the housing 92. The position of the diaphragm, and accordingly that of the arm 106, varies according to the gravity-influenced displacement of liquid in the container 92 and thus the diaphragm serves as a movable member having a normal position (Fig. 2) from which it is displaced to a displaced position, depending upon the liquid head differential as among A, B and heads of different amounts depending upon the list or tilt of the combine in the first instance.

The liquid head differential is attributable in the first place to the accommodation and balancing of friction and the weight of moving parts in the switch box 100. Except for that, the liquid head differential could be considered zero in the normal or level position of the combine. However, those distinctions are without importance.

The electrical switches 102 and 104 selectively energize and de-energize a double-acting solenoid 110 to control the shifting of a valve-actuating bar 112. Appropriate linkage at 114 obtains the necessary movement of the valve 72. The solenoid 110 in Fig. 2 is shown separate from the valve-housing 74 and in Figs. 3, 4 and 5 it is shown as integrated with the valve-housing. This difference is involved only as a result of an attempt to clarify the disclosure and is otherwise without importance. The switches 102 and 104 are wired into the circuit with the solenoid by leads 116 and 118, respectively.

The operation of this much of the system, which, as stated above, is based on that disclosed in assignee's copending application Ser. No. 430,338 filed May 17, 1954, now Patent No. 2,801,511, is briefly as follows: As the machine encounters ground surface inclined from the horizontal, as to the right in Fig. 4, the entire machine as a unit tilts or lists to the right. This causes an increase in the liquid head (B; Fig. 4) and the diaphragm 108 is displaced upwardly, closing the right hand (uppermost) switch 102 and energizing the solenoid 110 to operate through the bar and linkage 114 for shifting the valve 72 to the right. This connects the pump 76 to the line 80 for supplying fluid under pressure to the right hand motor 60, extending this motor. Simultaneously, the line 82 from the left hand motor 62 is connected to the reservoir line 86, and the left hand motor is retracted. The wheels 22 and 24 continue to follow the slope or inclined surface, but extension of the right hand motor and retraction of the left hand motor causes the body 20 to return to its level position. In short, the body is re-leveled to the position of Fig. 5. When the body attains its normal or level position, the original liquid head differential is restored (A; Fig. 5). The previously displaced diaphragm 108 thus returns to its normal position and the electrical circuit through the switch 102 is again broken, whereupon the centering means 88 returns the valve 72 to its neutral position and fluid is again hydraulically locked in the motors 60 and 62. Unless the slope changes again, the machine will continue to operate in the attitude of Fig. 5.

From the foregoing, it will be seen that several basic problems are involved, depending upon the rate of change in the liquid head differential. If the switches 102 and 104, acting in response to displacement of the diaphragm 108, are too sensitive to tilting of the machine, as from Fig. 3 to Fig. 4, the sensitivity will cause the switches to respond freely to small shocks and inertia loads. The sensitivity in this respect may be dampened by more tightly closing the needle valve 98. However, this will restrict the liquid flow also in the opposite direction and will delay the reaction of the system to re-leveling. Consequently, it has been determined, according to the present invention, that the dampening must be in one direction only. For this purpose, the invention provides what may be called a gravity booster which here operates on the principle of deriving force from relative movement between the body and the wheels when the body is re-leveled. At least part of this derived force is added to the gravitational force that acts to return the diaphragm or movable member to its normal position, whereby the combined forces boost or accelerate the return of the system to neutral or normal. The booster means in Figs. 1 through 5 is incorporated in part in the left hand liquid container 94, which serves as a cylinder in which a booster piston 120 is vertically movable in response to forces derived from relative movement between the body and wheels, because the container or cylinder 94 is fixed to the body and the piston 120 has its piston rod 122 connected by force-transmitting linkage 124 to the wheel means, as by a connection at 126 to part of the left hand wheel arm 32. In this regard, it should be noted that since the wheels are interconnected or equalized by the equalizer 36, a connection to either wheel or to the equalizer would serve the same purpose. Accordingly, the illustration is deemed to be suggestive and not limiting.

The booster piston 120 has an orifice 128 therethrough to permit the interchange of liquid from above and below the piston. Moreover, the orificed piston produces a dashpot effect as will be clarified below.

In operation, the boosting effect resulting from the derived force incurred by relative movement of the body and wheels in a re-leveling direction is additive to the gravitational force on the liquid in the containers 92 and 94 and conduit 96. The booster effect is not available in initial tilting of the machine, as from Fig. 3 to Fig. 4, since in that circumstance there is no relative movement between the body and wheels. Hence, the booster is without disturbing relationship on the adjustment of the needle valve 98 for obtaining proper reaction of the diaphragm 108 in responding to initial tilt. In other words, the diaphragm 108 can be dampened against reaction to small shock and inertia loads, without affecting its response to re-leveling of the body. This may be best understood by a brief description of the entire operation, assuming that the machine is traveling along level ground as in Fig. 3, then lists or tilts to the right as in Fig. 4 and is subsequently returned to neutral as in Fig. 5, with the body level and the wheels 22 and 24 accommodating the ground slope.

As the ground slope is first encountered, the entire machine tilts (Fig. 4), causing a change in the liquid head differential from A to B. The diaphragm 108 is displaced upwardly and the upper or right hand switch 102 is closed to energize the solenoid for achieving a shift of the valve 72 to the right. This, as previously described, causes extension of the right hand motor 60 and simultaneous retraction of the left hand motor 62. With the wheels still accommodating themselves to the ground slope, the body begins to return to its level positions; that is, it moves to the left from the position of Fig. 4 to that of Fig. 5. During tilting of the machine from Fig. 3 to Fig. 4, the dashpot effect of the orificed piston 120 is recognizable. That is to say, before the liquid head can change from A to B, the liquid below the piston 120 must flow, at least in part, through the restricted orifice 128. This retards the attainment of liquid head B and renders the switch 102 less sensitive to slight changes such as caused by shock, inertia or minor irregularities in the ground surface. The dampening or dashpot effect is also evident in tilting to the left of the Fig. 3 position, in which case downward displacement of the diaphragm 108 will be dampened and will therefore affect the sensitivity of the left hand switch 104.

The dampening effect is converted to a booster effect on re-leveling of the body. For example, as the body tends to return from the position of Fig. 4 to that of Fig. 5, the body pivots relative to the wheel means 22—24—36 about the pivot 38, because the right hand motor 60 extends and the left hand motor 62 retracts. In effect, the wheel 24 and its arm 32 rise relative to the body, thus transmitting an upward force to the piston 120 via the link 124 and piston rod 122. The pressure on the liquid below the piston 128 thus becomes materially less than atmospheric pressure acting on top of the diaphragm 108, with the result that the return of the diaphragm to its normal position is accelerated or boosted. That is to say, the diaphragm would return to its normal position by the action of gravitational force but the force derived from the link 124 is added to the gravitational return force and a most desirable result is obtained.

In tilting from the Fig. 3 position to the left, followed by re-leveling (just the opposite of Figs. 4 and 5), the ground slope in the other direction requires extension of the left hand motor 62 and retraction of the right hand motor 60. Thereupon, the body, when being re-leveled, moves away from the left hand wheel 24 and a downward force is transmitted by the link 124 to the piston 120. As the piston 120 moves downwardly, it increases the pressure on the liquid in the gravity-influenced means and this pressure lifts the diaphragm to break the circuit to the lower or left hand switch 104. Hence, the gravity-influenced means as assisted by the booster means is bi-directional. In initial tilting in both directions, the dashpot effect is apparent to create a retarding action and the booster effect is experienced as an accelerating action. As will be readily seen, the liquid container 94 is part of the gravity-influenced means as well as being part of the booster means, the latter with respect to at least the cooperation of the container with or serving as a cylinder for the booster piston 120. In other forms of the invention to be described below, the partial duality is not in all cases repeated, but the same generic principle is applicable.

*Figures 6 and 7*

Structural components similar to those in Figs. 1 through 5 will be recognized here by their appearance as well as by the application thereto of reference characters previously used. In view of this guarantee against confusion, it is deemed unnecessary to redescribe parts that are common to both of these forms of the invention. Different reference characters will, however, be used where important distinctions exist.

One of these distinctions is in the gravity-influenced means, here designated generally by the letter $G^1$ and including a pendulum 130 pivoted at 132 on the body 20, preferably on the rear wall of the grain tank 46. The pendulum is connected below the pivot 132 to the valve 72 by a bi-directionally yielding spring transmission 134, the purpose of which is to enable manual shifting of the valve 72 by the hand lever 90 without the requirement that the pendulum be also shifted. If the function of the hand lever—of relative insignificance in the present case—be ignored, the transmission at 134 could be considered a rigid link. The liquid container at the left hand side of Fig. 6 has very much the appearance of the container 94 in Figs. 1 through 5 but in view of its primary function as a booster alone, as distinguished from its dual function in Figs. 1 through 5, it is given a separate reference character, here 136. This container is in the form of a cylinder in which a booster piston 138 is movable by vertical forces transmitted to its piston rod 140 by a force transmitting link 142 of the same character as the previously described link 124. The link 142 is connected to the left hand wheel means 24 as at 144. A dashpot 146 is interposed in the transmission between the cylinder 136 and the pendulum 130. This dashpot comprises a chamber 148 within which is movable a dashpot piston 150. The piston is mechanically connected by a link 152 to the pendulum and the chamber is liquid-connected to the booster cylinder 136 by a conduit 154. As illustrated, a valve 156 may be utilized to regulate the rate of flow between the cylinders 136 and 148. The booster piston is orificed at 158 and the dashpot piston is orificed at 160.

In operation, as the machine encounters a ground slope, as to the right, the entire machine will tilt to the right (compare the change from Fig. 3 to Fig. 4). Consequently, the pendulum 130 will swing to the right and will operate through the transmission 134 to shift the valve 72 to the right, thus activating the motor 60 for extension and the motor 62 for retraction. The sensitivity of the pendulum 132 to depart from its normal position is dampened by the dashpot influence at 158 and 160. Consequently, the dashpot effect is instrumental in preventing response to minor shock loads, inertia, small variations in ground contour etc. As the body and wheels move in unison to the tilted position, there will be no relative vertical movement between the body and wheels. However, as the valve 72 is shifted to its active position to activate the motors as just described, to effect re-leveling of the body, the link 142 will transmit an upward force to the booster piston 138, materially dropping the pressure at the left hand side of the dashpot piston 150 and reducing the resistance to return of the pendulum 130 to its gravitationally-influenced normal position. In other words, the pendulum now does not have to force liquid through the orifice 160. Therefore, there is present the same type of booster action already described in connection with Figs. 1 through 5. The booster action here, as before, is the result of derived force incurred by relative movement between the body and wheels as the body is re-leveled. The same results are obtained upon tilting to the left and re-leveling from the left. The design of the booster means is such that it may be readily incorporated into existing designs, many of which use one form or another of the pendulum principle as the gravity-influenced means.

Figure 8:
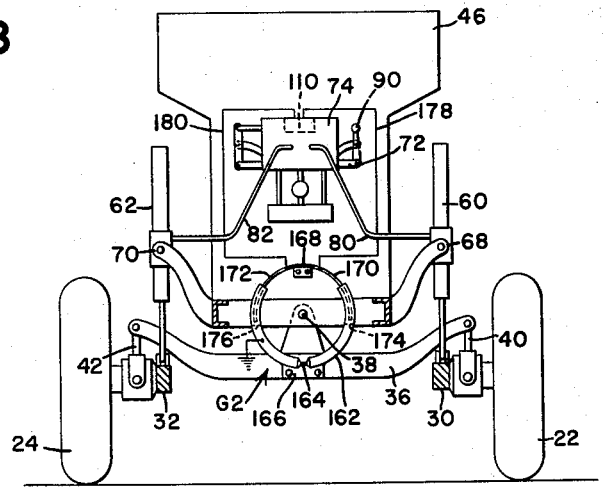
Figs. 8, 9 and 10, show respectively, third, fourth and fifth modifications of the invention, each view showing the machine in a level or normal position.

*Figure 8*

In this form of the invention, the gravity-influenced means is designated generally by the letter $G^2$ and is illustrated as an arcuate tube 162 which serves as a container for an electrically conductive liquid such as mercury. This tube or container is restrictively separated into substantially equal halves by a restricted neck 164. A suitable mount at 166 affixes the tube to the equalizer 36, which amounts to the same thing as connecting the tube to the wheel means as distinguished from a connection to the body. The mercury is suitably grounded as indicated.

A non-conductive bracket 168 mounts right and left hand conductors 170 and 172. The free end portions of these conductors extend respectively into the opposite halves of the mercury tube 162 and when the machine is level are out of contact with the mercury, as indicated respectively at 174 and 176. The conductors are connected by leads 178 and 180, respectively, to the double-acting solenoid 110.

In operation, when a ground slope that inclines, for example, to the right is encountered, the entire machine will tilt (compare Fig. 4). The mercury level will change relative to the conductors 170 and 172, making contact with the conductor 170 and moving farther away from the conductor 172. Undesirable reaction of the control system to inertia loads, shocks and minor variations in ground contour is avoided by means of the restrictive neck at 164, which corresponds to the dashpot effects previously described.

Since, when the machine tilts, for example, to the right, the body and wheels tilt in unison, there will be no relative movement between the conductor means 170—172 and the liquid container or mercury tube 162. However, as contact is effected between 170 and the mercury in the tube 162, as when the gap at 174 is closed, the valve 72 is shifted to the right to cause extension of the right hand motor 60 and retraction of the left hand motor 62. Thereupon, the body begins to re-level. As it does so, relative movement occuring between the body and the wheels causes the conductor means 170—172 to move bodily relative to the equalizer-carrier tube 162. Hence, contact at 174 will be broken in an accelerated or boosted fashion. That is to say, the contact will be broken faster than if it awaited the gravity-influenced change in relationship between the liquid and the contact. Therefore, a booster effect is achieved by the mounting of the tube 162 on the wheel means and the mounting of the conductor means 170 and 172 on the body. Reversal of the arrangement just described will readily suggest itself.

Functioning of the system upon tilting to the left and re-leveling from the left is symmetrical as respects that just described and need not be repeated.

Figure 9:
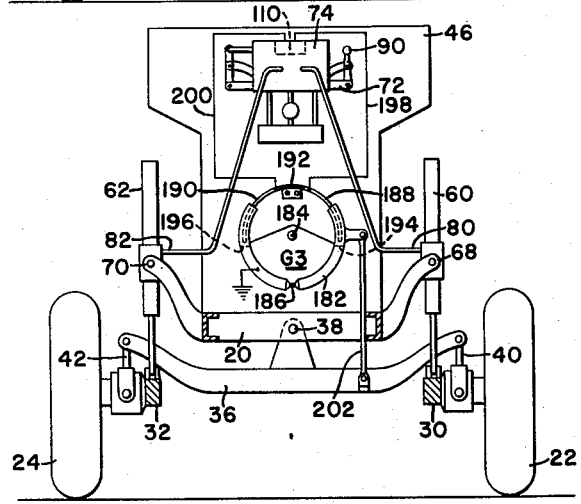

*Figure 9*

In this form of the invention, a container such as a mercury-containing tube 182 is pivoted to the body on a fore-and-aft pivot 184. Opposite halves of the arcuate length of the tube are divided by a restrictive neck portion 186. Conductor means comprising right and left hand conductors 188 and 190 are affixed to the body 20 by a non-conductive bracket 192 and the free ends of the conductors are spaced from the mercury level, as at 194 and 196, when the body is level. The conductors are connected by leads 198 and 200, respectively, to the solenoid 110.

The booster effect is here achieved by means of the pivotal mounting of the container or tube 182 at 184 and by the interconnection of the tube and equalizer 36 by a force-transmitting link 202. Again, the equalizer, being interconnected between the wheels, serves as the equivalent of connecting the link 202 directly to one or the other of the wheels or wheel arms.

The general characteristics of operation are the same as those discussed above. In brief, let it be assumed that the slope of the ground transverse to the line of advance is to the right. Again, the entire machine will tilt as a unit, and contact will be established between the conductor 188 and the tube-contained mercury by closing the gap at 194. Since the body and wheel means tilt as a unit, there will be no relative movement between the conductor means and the container means. When contact is effected at 194, the solenoid 110 is energized to cause the valve 72 to shift to the right for activating the right hand motor 60 in extension and left hand motor 62 in retraction. As re-leveling occurs, the body 20 pivots to the left relative to the wheel means 22—24—36 about the pivot 38. In effect, the wheel 22 moves downwardly and away from the body 20, thus exerting a tensional force in the link 202 to pivot the tube 182 in a clockwise direction as seen in Fig. 9. This accelerates the breaking of the contact at 194, thus achieving the booster effect to serve the purposes served by the booster means previously described. Pivoting of the tube 182 on the body at 184 plus the force-transmitting link 202 is, as will be seen, equivalent to mounting the tube on the equalizer and mounting the conductor means on the body.

Figure 10:
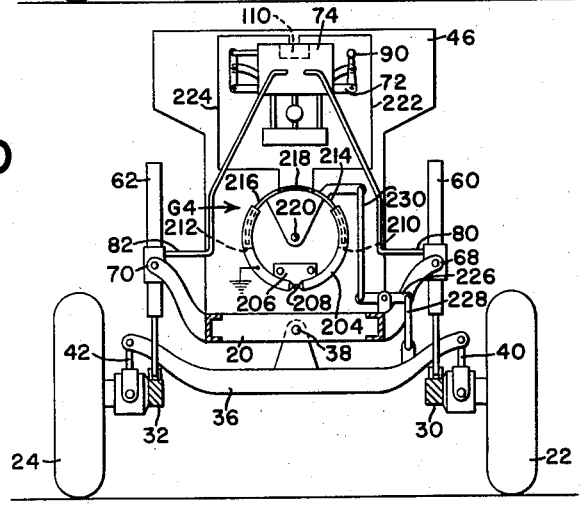

*Figure 10*

This form of the invention represents a reversal of what is shown in Fig. 9. Here, a container or mercury-containing tube 204 is affixed to the body 20 as by a bracket 206 and is necked down at 208 to afford the necessary restriction that divides the tube into substantially symmetrical halves for containing mercury at a normal level gapped respectively at 210 and 212 from the free ends of right and left hand conductors 214 and 216. These conductors are insulated from each other at 218 but are mounted as a unit on the body by means of a fore-and-aft pivot 220. The conductors are connected by leads 222 and 224, respectively, to the solenoid 110. Force-transmitting linkage interconnects the wheel means and the conductor means so that the latter partakes of movement of the former. The linkage shown includes an intermediate lever 226 pivoted on the body, a link 228 connecting one end of the lever to the equalizer 36 and another link 230 connecting the other end of the lever to the conductor means 214—216.

Operation of this form of the control system follows generally those previously described. Again, it will be assumed that the machine encounters a slope to the right and transverse to the line of advance. Initially, the entire machine tilts as a unit (compare Fig. 4) and there is no relative movement between the conductor means 214—216 and the container means 204. However, the gravity-influenced change in relationship between the mercury level and the conductor means creates a contact at 210 between the mercury and the right hand conductor 214, which, through the lead 222, energizes the solenoid 110 to effect shifting of the valve 72 to the right from its neutral position. This activates the right hand motor 60 in extension and the left hand motor 62 in retraction, causing the body part to be re-leveled. As the body returns to its original level position, relative movement occurs between the body and the wheel means, about the fore-and-aft pivot at 38. The relative movement thus incurred creates a derived booster force effective through the linkage 226—228—230 to move the conductor means 214—216 in a counterclockwise direction relative to the container means or tube 204, thus accelerating the break of contact at 210. This occurs because as the body re-levels, it moves away from the right hand wheel 22. The link 228 is connected to the equalizer 36 near the right hand wheel and consequently the link operates in tension to swing the lever 226 in a clockwise direction. This is followed by an upward force transmitted through the link 230 to the conductor means to achieve the counterclockwise movement referred to above.

*Summary*

As already indicated, all forms of the invention involve simple and practical booster means usable in connection with known types of leveling systems. The fundamental features of the invention, in the broadest aspects of all of its forms, are dampening of the system in a tilting direction and accelerating the response of the system in a re-leveling direction. Other features not categorically enumerated will undoubtedly occur to those versed in the art, as will further modifications other than those illustrated, all of which may be achieved without departing from the spirit and scope of the invention.

What is claimed is:

1. A leveling control system for an agricultural machine having a tiltable body part carried for advance over a field by first and second ground-engaging wheel means spaced apart and connected to the body part for movement relative to the body part and relative to each other in opposite vertical directions to assume different elevations in accordance with ground contour encountered thereby, said leveling control system comprising: power-operated leveling means connected between the body part and the wheel means and normally demobilized to permit the body part to tend to tilt as the wheel means assume different relative elevations but mobilizable to adjust the body part relative to the wheel means for returning the body part to level position irrespective of such difference in elevation; an actuator carried by the machine for movement between a neutral position and an active position to respectively demobilize and mobilize the leveling means; machine-carried gravity-influenced means including a member movable from a normal position when the body part is level to a displaced position when the body part tilts and back to normal when the body part is re-leveled; means interconnecting the actuator and the gravity-influenced member for incurring the active position of the actuator in response to displacement of said member when the body part tilts and for returning the actuator to its neutral position as said member returns to its normal position when the body part is re-leveled by the mobilized leveling means; and booster means including a force-transmitting part connected to at least one wheel means for deriving force from relative movement between the body part and wheel means when the body part is re-leveled and operative to add at least part of that force to the gravitational force that acts to return the member to normal so as to boost said return.

2. The invention defined in claim 1, in which: the gravity-influenced means includes, in addition to the movable member, first and second conduit-connected liquid containers spaced apart in the direction of the spacing of the first and second wheel means and connected to and movable in unison with the body part so as to partake of the initial tilt of said part, said member being exposed to and influenced by changes in liquid pressure in the containers and the second container being so positioned relative to the first container when the body part is level as to achieve a normal liquid head differential between the containers and thereby to maintain a substantially constant pressure on the movable member for incurring the normal position of said member, and said liquid head differential varying according to tilt of the body part to displace said member; and the booster means includes a part acting on the liquid in the second container.

3. The invention defined in claim 2, in which: the second container comprises a cylinder; the booster part is a piston in said cylinder; and the booster means part includes a force-transmitting link between at least one wheel means and the piston.

4. The invention defined in claim 3, in which: the piston has a restricted orifice therethrough for accommodating liquid flow back and forth to opposite sides thereof to produce a dashpot effect retarding displacement of the member.

5. The invention defined in claim 1, in which: the movable member is a pendulum and the booster means additionally includes a booster cylinder element, a booster piston element therein, and fluid-pressure-transmitting means connected to the cylinder and to the pendulum, one element being connected to the body part and the other element being connected to said booster means part so that the force derived from relative movement between the body part and wheel means is transmitted by the piston to fluid in the cylinder and thence to the pendulum via the fluid-pressure-transmitting means.

6. The invention defined in claim 5, in which: the fluid-pressure-transmitting means includes a transmission cylinder having a conduit connection to the booster cylinder and connected to the pendulum, and said piston in the transmission cylinder has an orifice therethrough for producing a dashpot effect to retard displacement of the pendulum.

7. The invention defined in claim 5, in which: the piston has an orifice therethrough producing a dashpot effect to retard displacement of the pendulum.

8. The invention defined in claim 7, in which: the fluid-pressure-transmitting means includes a transmission cylinder having a conduit connection to the booster cylinder, a piston in the transmission cylinder and connected to the pendulum, and said piston in the transmission cylinder has an orifice therethrough for producing an additional dashpot effect acting to retard displacement of the pendulum.

9. The invention defined in claim 1, in which: the booster means includes a fluid container, pressure-changing means acting on fluid in said container and partaking of said derived force via said booster means part, and means transmitting the pressure changes to the movable member as gravity-booster forces.

10. The invention defined in claim 1, in which: the actuator is electrically responsive; the gravity-influenced means includes a container element for containing electrically-conductive liquid at a normal relative level when the body part is level and the member is a conductor element out of contact with the liquid when the body part is level, said elements being movable in unison when the body part tilts so that the relative level of the liquid changes and effects contact with the conductor element; and the booster means comprises means connecting one element to the body part and the other element to the booster means part so that said elements move relatively when the body part is re-leveled to accelerate breaking of said contact.

11. The invention defined in claim 10, in which: the container element has opposite sides spaced apart in the direction of the spacing of the wheel means and said sides are centrally interconnected by a restrictive-flow portion.

12. The invention defined in claim 10, in which: the container element is fixed to the wheel means and serves as said booster means part and the conductor element is fixed to the body part.

13. The invention defined in claim 10, in which: the container element is pivoted to the body to swing selectively in opposite directions according to the spacing of the wheel means; the conductor element is fixed to the body part; and force-transmitting linkage means is connected between the container element and the booster means part for moving the container element relative to the conductor element in response to relative movement between the body part and wheel means as the body part is re-leveled.

14. The invention defined in claim 10, in which: the conductor element is pivoted to the body to swing selectively in opposite directions according to the spacing of the wheel means; the container element is fixed to the body part; and force-transmitting linkage means is connected between the conductor element and the booster means part for moving the element relatively in response to relative movement between the body part and wheel means as the body part is re-leveled.

15. The invention defined in claim 1, in which: the gravity-influenced means includes a liquid container means in which the status of the liquid changes by gravity according to level, tilt and re-level of the body part, and the movable member is responsive to such changes; and the booster means part is operative to impose at least part of said derived force on the liquid as an additive to the forces of gravity when the body part is re-leveled.

16. The invention defined in claim 1, in which: the gravity-influenced means includes a liquid container means in which the status of the liquid changes by gravity according to level, tilt and re-level of the body part, and the movable member is responsive to such changes; the container means is mounted on the body part for movement with the body part when the body part tilts and for movement relative to the body part when said part is re-leveled; and the booster means part is connected to the container means and operates to change the position of the container when the body part is re-leveled so as to impose at least part of said derived force on the liquid as an additive to the forces of gravity.

17. A leveling control system for an agricultural machine having a tiltable body part carried for advance over a field by first and second ground-engaging wheel means spaced apart and connected to the body part for movement relative to the body part and relative to each other in opposite vertical directions to assume different elevations in accordance with ground contour encountered thereby, said leveling control system comprising: power-operated leveling means connected between the body part and the wheel means and normally demobilized to permit the body part to tend to tilt as the wheel means assume different relative elevations but mobilizable to adjust the body part relative to the wheel means for returning the body part to level position irrespective of such difference in elevation; an actuator carried by the machine for movement between a neutral position and an active position to respectively demobilize and mobilize the leveling means; machine-carried gravity-influenced means including a member movable from a normal position when the body part is level to a displaced position when the body part tilts and back to normal when the body part is re-leveled; dampening means retarding movement of the member between said positions; means interconnecting the actuator and the gravity-influenced member for incurring the active position of the actuator in response to displacement of said member when the body part tilts and for returning the actuator to its neutral position as said member returns to its normal position when the body part is re-leveled by the mobilized leveling means; and booster means including a force-transmitting part connected to at least one wheel means for deriving force from relative movement between the body part and wheel means when the body part is re-leveled and operative to offset at least in part the tendency of the dampening means to retard gravitational return of said member to its normal position.

References Cited in the file of this patent

UNITED STATES PATENTS

| | | |
|---|---|---|
| 2,278,081 | Kramer | Mar. 31, 1942 |
| 2,473,903 | Purifoy | June 21, 1949 |
| 2,684,254 | Goss | July 20, 1954 |
| 2,742,298 | Witzel | Apr. 17, 1956 |